United States Patent
Jo et al.

(10) Patent No.: US 8,090,529 B2
(45) Date of Patent: Jan. 3, 2012

(54) SYSTEM FOR DIMINISHING THE LOAD OF PLATFORM WHICH TRACES THE LOCATION OF MOVING OBJECTS AND METHOD THEREOF

(75) Inventors: Jung-Hee Jo, Daejeon (KR); Kyoung-Wook Min, Daejeon (KR); Ju-Wan Kim, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 800 days.

(21) Appl. No.: 12/096,761

(22) PCT Filed: Dec. 30, 2005

(86) PCT No.: PCT/KR2005/004667
§ 371 (c)(1),
(2), (4) Date: Jun. 9, 2008

(87) PCT Pub. No.: WO2007/066849
PCT Pub. Date: Jun. 14, 2007

(65) Prior Publication Data
US 2008/0294334 A1    Nov. 27, 2008

(30) Foreign Application Priority Data
Dec. 9, 2005 (KR) .................. 10-2005-0120996

(51) Int. Cl.
*G01C 21/00* (2006.01)
(52) U.S. Cl. ........ 701/204; 701/209; 701/300; 340/991; 340/994; 340/995.23

(58) Field of Classification Search .................. 701/204, 701/207, 208, 209, 211, 300; 340/988, 991, 340/994, 995.23; 342/357.74
See application file for complete search history.

(56) References Cited

U.S. PATENT DOCUMENTS
6,351,707 B1 * 2/2002 Ichikawa .................. 701/209
6,965,827 B1 * 11/2005 Wolfson .................... 701/207

FOREIGN PATENT DOCUMENTS
JP    2002-286473 A    10/2002
JP    2002-286843       10/2002
(Continued)

OTHER PUBLICATIONS
International Search Report for corresponding International Application No. PCT/KR2005/004667 dated Jul. 31, 2006.
(Continued)

Primary Examiner — Getrude Arthur Jeanglaude
(74) Attorney, Agent, or Firm — Kile Park Goekjian Reed & McManus PLLC

(57) ABSTRACT

In existing moving object tracking, there is a great communication load between a terminal and a platform, because the terminal should report its location to the platform every second or every minute and the platform should frequently process the location form the terminal. It is possible to reduce the great communication load on the server, by calculating an error between the current GPS location and the estimated location at a specific time on the basis of the estimated arrival time of the moving object. It allows that the terminal report its location to the server only when the error between current GPS location and the estimated location is greater than a predetermined threshold value.

9 Claims, 3 Drawing Sheets

FOREIGN PATENT DOCUMENTS

| | | |
|---|---|---|
| JP | 2003-207363 | 7/2003 |
| JP | 2004-280320 A | 10/2004 |
| JP | 2005-167811 | 6/2005 |
| KR | 10-2004-0050741 | 6/2004 |
| KR | 10-2005-0046035 | 5/2005 |

OTHER PUBLICATIONS

Written Opinion of the Ineternational Searching Authority for corresponding International Application No. PCT/KR2005/004667 dated Jul. 31, 2006.

* cited by examiner

US 8,090,529 B2

SYSTEM FOR DIMINISHING THE LOAD OF PLATFORM WHICH TRACES THE LOCATION OF MOVING OBJECTS AND METHOD THEREOF

TECHNICAL FIELD

The present invention relates to a system and a method for reducing a communication load of a platform for tracking a moving object, and more particularly, to a system and a method for reducing a communication load of a tracking platform in which an estimated arrival time for a moving object to move from a current location to an arrival location (destination) is calculated and then a communication path between the moving object to be tracked and the tracking platform is disconnected when the calculation of the estimated arrival time is completed.

BACKGROUND ART

There are known three tracking methods. In the first method, a terminal of a moving object reports an own location to a tracking server (hereinafter, referred to as "tracking platform" or "platform") at constant time intervals. In the second method, the platform requests the terminal to send the location of the moving object. In the third method, when road network data is available, the terminal reports the location of the moving object to the platform based on road segment information only if road segments are changed.

In the first method, the terminal reports its location to the platform every second or every minute and the platform processes data on the reported location. Accordingly, an excessive overloading of communication data load between the terminal and the platform can be caused. Therefore, the first method is not suitable for urgent cases with the need for urgency and accuracy.

In the second method, when the time interval at which the platform acquires the location of the terminal decreases, the platform requests the location of the terminal more frequently, and the terminal has to collect, calculate, and report the location information in response to the request. Accordingly, the excessive overloading of communication data load between the terminal and the platform may be caused as the first method. In addition, the platform needs to track the location of the terminal in real time, which is not supported by the second method.

In the third method, the terminal has to report the location of the terminal to the platform every road segment. In this method, the frequency of reporting the location is less than that of the first or second method and the platform can track the terminal in real time. However, if the road network is consisted of a number of small road segments, the communication load between the terminal and the platform may be increased as the first and second methods. The reason is, as the number of road segments increases, the number of issuing updates also increases.

BRIEF SUMMARY OF THE INVENTION

Technical Goal of the Invention Problem

Figure 1:
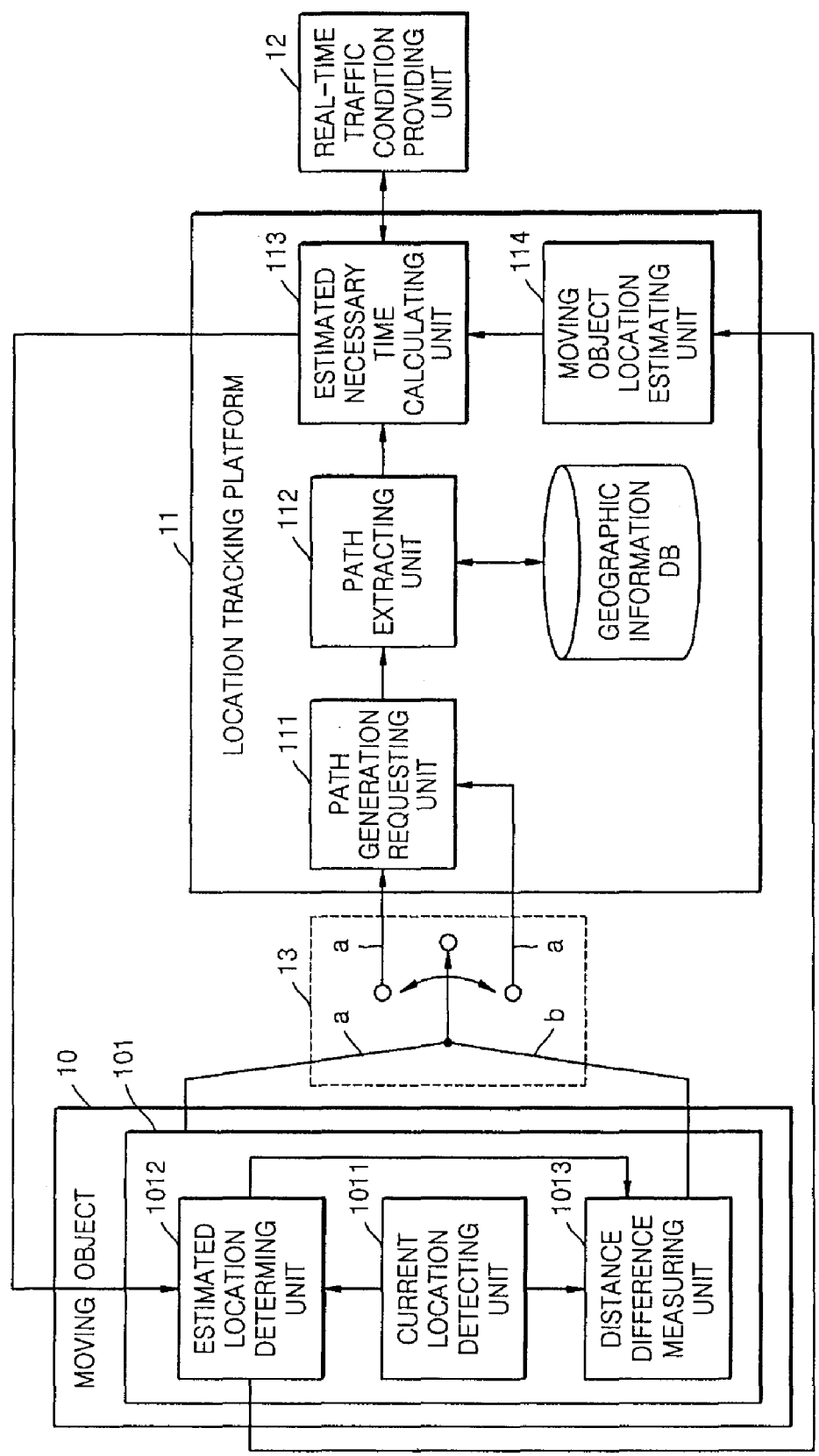
FIG. 1 shows a system according to an exemplary embodiment of the present invention.

The present invention provides a system and a method for reducing a communication load of a platform for tracking a moving object by reducing the frequency of communications for reporting a location of a terminal of the moving object.

Disclosure of the Invention Technical Solution

A moving object occupant (a terminal user) inputs a current location and an arrival location of the moving object by the use of a terminal having a location detection module and reports the current location and the arrival location to a platform. The platform searches a geographic information database (DB) for location information on the current location and the arrival location, extracts all the possible paths, and calculates an estimated arrival time. The platform transmits the extracted paths and the estimated arrival time to the moving object (terminal).

The terminal calculates a difference in distance between the current location and an estimated location of the moving object detected in real time by the location estimation module built in the moving object on the basis of all the possible paths, the estimated arrival time, and the current location information of the moving object detected in real time by the location detection module. At this time, the current location of the moving object is reported only when the difference in distance is greater than a predetermined threshold value.

Advantageous Effect of the Invention

According to the present invention, it is possible to drastically reduce the frequency of communication between the terminal and the server and communication load on the server. The reason is that location update from terminal to server is happened only if predefined threshold is exceed at predefined location at a specific time, on the basis of the estimated arrival time of the moving object.

In addition, according to the present invention, it is possible for the server to estimate the location of the moving object by the use of a location estimation algorithm, without any additional communication between the terminal and server. Therefore, when location based service providers request the server for the location of the moving object, the server can provide the location of the moving object in real time on the basis of the estimation data without any additional communication with the terminal.

DETAILED DESCRIPTION OF THE INVENTION

According to an aspect of the present invention, there is a provided system for reducing a communication load of a platform for tracking a moving object, the system including: an estimated arrival time calculating unit receiving a current location and an arrival location of the moving object from the moving object, calculating estimated arrival time for the moving object to reach the arrival location, and transmitting the estimated arrival time to the moving object; a terminal which is located in the moving object, receiving the estimated arrival time and determining an estimated location; and a communication path on-off controlling unit inactivating a communication path for reporting the current location and the arrival location from the moving object when the terminal receives the estimated arrival time is received, and activating the communication path when the estimated arrival time has to be newly calculated again.

According to an aspect of the present invention, there is provided a method of reducing a communication load of a platform for tracking a moving object, the method including: (a) receiving a current location and an arrival location of the moving object, calculating an estimated arrival time for the moving object to reach the arrival location, and transmitting the estimated arrival time to the moving object; (b) transmitting the estimated arrival time to a terminal of the moving object and allowing the terminal, which is located in the moving object, to determine an estimated location of the moving object; and (c) inactivating a communication path for reporting the current location and the arrival location from the moving object when the terminal receives the estimated arrival time. In addition, the method may further include (d) activating the communication path when the estimated arrival time has to be newly calculated again.

Mode for Invention Embodiments

Hereinafter, the present invention will be described in detail by explaining exemplary embodiments of the invention with reference to the attached drawings. Like reference numerals in the drawings denote like elements.

Figure 2:
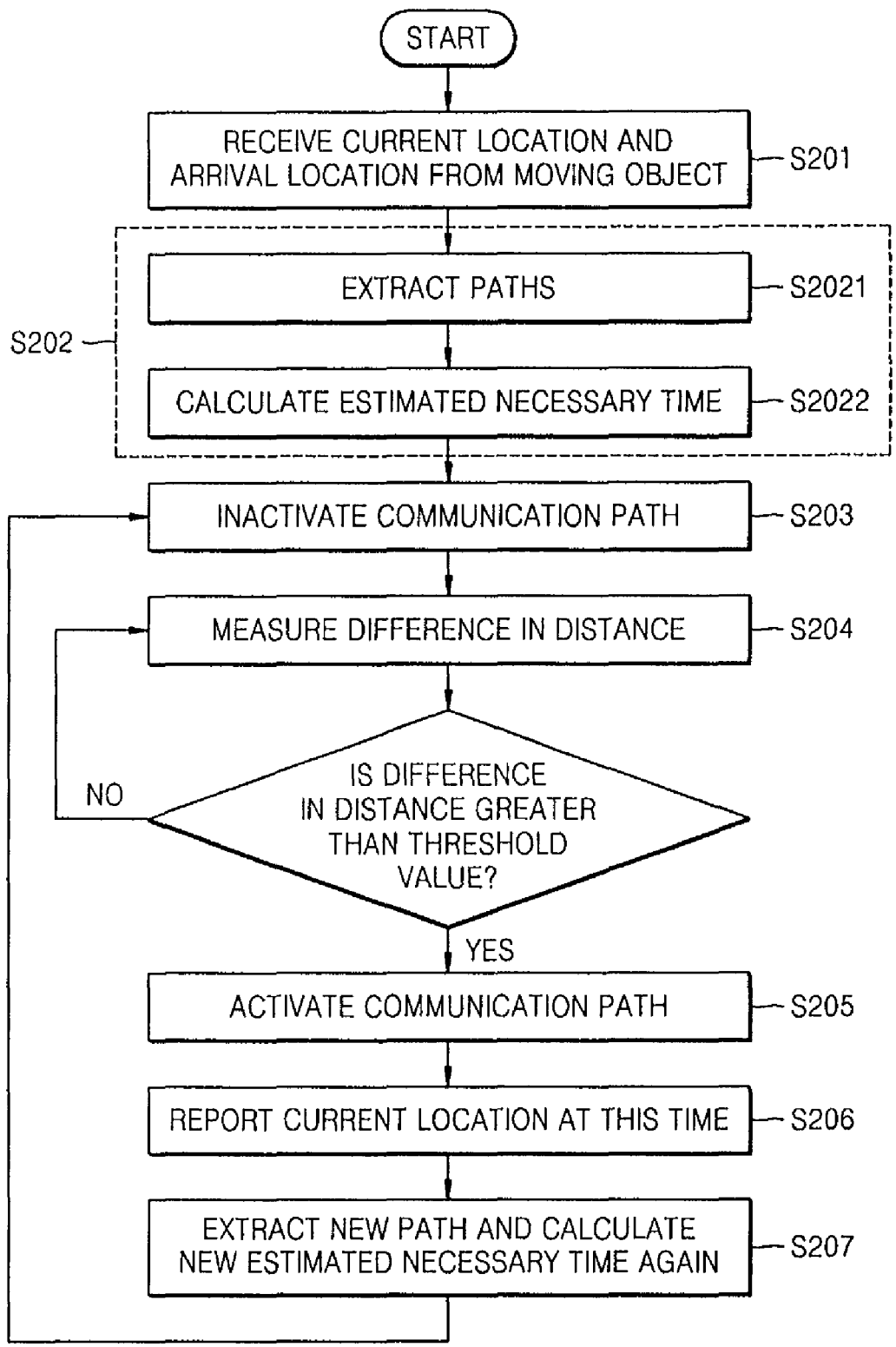
FIG. 2 is a flowchart of a method according to an exemplary embodiment of the present invention.

FIG. 1 shows an exemplary embodiment of a system according to the present invention and FIG. 2 shows an embodiment of a method according to the present invention.

A location-tracking platform 11 corresponds to the aforementioned platform. The location-tracking platform 11 extracts paths between the current location and the arrival location of a moving object 10 by receiving the current location and the arrival location from the terminal 101. Then the location-tracking platform 11 calculates the estimated arrival time to move from an arbitrary location on the extracted path to the arrival location.

For this, the location-tracking platform 11 includes a path generation requesting unit 111, a path extracting unit 112 and an estimated arrival time calculating unit 113. When a current location and an arrival location of a moving object 10 are reported from a terminal 101 located in a moving object 10 (S201), all the possible paths between the current location and the arrival location are extracted on the basis of the reported current location and arrival location and the estimated arrival time is calculated and transmitted to the terminal 101 (S202). Alternatively, the location-tracking platform 11 further includes a moving object location estimating unit 114 with a real-time location estimation algorithm and estimates the location of the moving object 10. The estimated arrival time is calculated based on the estimated location.

Hereinafter, a function of tracking the moving object 10 performed by the path generation requesting unit 111, the path extracting unit 112, the estimated arrival time calculating unit 113, and the moving object location estimating unit 114, will be described in detail. The path generation requesting unit 111 receives the current location and the arrival location from the terminal 101 located in the moving object 10, makes a request message for generating paths between both locations and transmits the request message to the path extracting unit 112.

The path extracting unit 112 receives the request message from the path generation requesting unit 111, accesses to a geographic database (DB), extracts all the possible paths between both locations, and transmits the extracted paths to the estimated arrival time calculating unit 113.

The estimated arrival time calculating unit 113 calculates the estimated arrival time to move from the arbitrary location to the arrival location of the moving object 10 with reference to the extracted paths and an estimated location of the moving object 10 estimated by the moving object location estimating unit 114 in real time and then transmits the calculation result together with the extracted path information to the terminal 101.

An exemplary embodiment of the present invention will be described in detail with reference to FIGS. 1 and 2.

The location-tracking platform 11 receives the current location and the arrival location from the terminal 101 located in the moving object 10 through the reporting path and transmits the current location and the arrival location to the path generation requesting unit 111. The reporting paths a and b will be described clearly in the following. The terminal 101 includes an own current location detecting unit 1101 detecting the current location (real location) of the moving object 10 in real time, and the terminal user inputs the current location detected by the current location detecting unit 1101 and the arrival location of the terminal user through the terminal 101 and then transmits the inputs to the location-tracking platform 11.

The path generation requesting unit 111 makes the request message for generating paths including information on the current location and arrival location and transmits the request message to the path extracting unit 112. When the path extracting unit 112 extracts all the possible paths between both locations from the geographic DB (S2021), the path extracting unit 112 converts the information on the current location and arrival location into coordinate data, transmits the converted data to the path information DB, receives the information on all the possible paths between the current location and the arrival location, and extracts the paths between both locations.

The estimated arrival time calculating unit 113 receives all the possible paths extracted by the path extracting unit 112, accesses to a real-time traffic condition providing server 12, and receives current traffic conditions. In addition, the estimated arrival time calculating unit 113 refers to the estimated location of the moving object 10 estimated by the moving object location estimating unit 114 in real time, calculates the estimated arrival time for the moving object 10 to reach the arrival location from an arbitrary location, and transmits the calculation result together with the extracted path information to the terminal 101 (S2202).

At this time, an estimated location determining unit 1012 built in the terminal 101 located in the mobile object 10 and the moving object location estimating unit 114 estimates the location of the moving object 10 interactively. Specifically, the estimated location determining unit 1012 estimates a location of the moving object 10 at an arbitrary location based on all the possible paths to the arrival location received from the location-tracking platform 11, the estimated arrival time, and the current location of the terminal 101 detected by the current location detecting unit 1101 in real time.

When all the possible paths to the arrival location, the estimated arrival time, and so on are transmitted to the terminal 101, a communication path on-off controlling unit 13 inactivates the reporting paths a and b as a normal neutral state (the state at which both paths are not activated). The communication path on-off controlling unit 13 will be described more clearly in the following.

A distance difference measuring unit 1013 compares the current location detected by the current location detecting unit 1011 in real time with the estimated location detected by the estimated location determining unit 1012 in real time and measures the difference in distance between the current location and the estimated location in real time (S204).

When the difference in distance between the current location and the estimated location is greater than the predetermined threshold value, the distance difference measuring unit 1013 makes the communication path on-off controlling unit 13 activate the communication path (reporting path) b for reporting that the difference in distance is greater than the threshold value (S205). The distance difference measuring unit 1013 reports the current location through the reporting path b to the location tracking platform 11 when the difference in distance between the current location and the estimated location is greater than the predetermined threshold value (S206).

The path from the new current location received from the distance difference measuring unit 1013 to the arrival location are newly extracted, and the estimated arrival time is newly calculated (S207) and transmitted to the terminal 101, by the function modules of the tracking platform 11 as described above. After being transmitted to the terminal 101, the aforementioned operations are performed as described above (S208). The terminal 101 and the location tracking platform 11 estimates and tracks the location of the moving object 10 continuously by the use of the location estimation algorithm on the basis of the new path and estimated arrival time in real time until the moving object 10 reaches the arrival location.

The communication path on-off controlling unit 13 is used for activating one of the reporting communication paths a and b and is included so as to reduce the communication load.

That is, the communication path on-off controlling unit 13 activates the reporting path a when a terminal user reports the current location and the arrival location to the location tracking platform 11 through the terminal 101. The communication path on-off controlling unit 13 activates the reporting path b when the difference in distance is greater than the predetermined threshold value. The communication path on-off controlling unit 13 inactivates both reporting paths a and b in the other cases. Therefore, communication path on-off controlling unit 13 can suppress unnecessary communications between the terminal 101 and the location tracking platform 11.

When the extraction of the path and the calculation of the estimated arrival time are requested from the communication path on-off controller 13, that is, the aforementioned report is requested, the communication path on-off controlling unit 13 detects the report event and holds the communication state for reporting the current location and the arrival location from the terminal 101 to the location tracking platform 11 to reduce the communication load. The report event according to an embodiment of the present invention occurs only when the user inputs the current location and the arrival location and requests the tracking location platform 11 to track the moving object or the difference in distance is greater than the predetermined threshold value, or so the location tracking platform 11 has to calculate the estimated arrival time.

Figure 3:
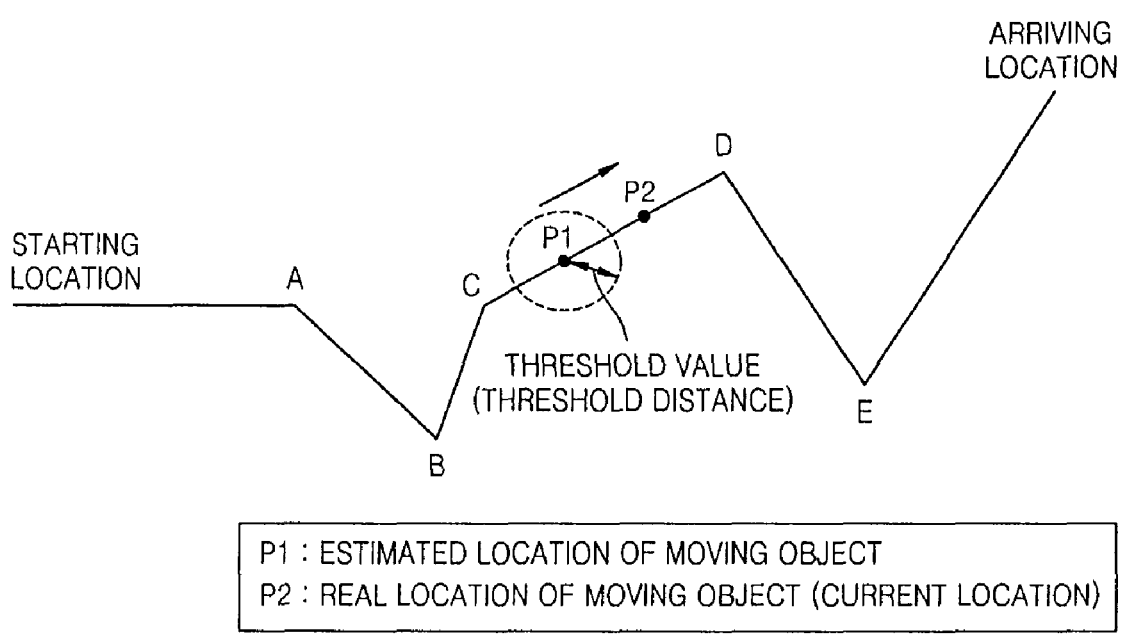
FIG. 3 shows an example of the present invention in relation to a path (road).

FIG. 3 shows an example according to the present invention in relation to a path (road).

For example, when the moving object 10 having the terminal 101 desires to move from a predetermined starting location to the arrival location, the terminal 101 detects the current location through the current location detecting unit 1011 and transmits the detection result together with current speed information to the tracking platform 11, and the path extracting unit 112 in the location tracking platform 11 accesses to the geographic DB and extracts all the possible paths between the starting location and the arrival location.

In a case where the terminal 101 reports the current location of the moving object 10 to the location tracking platform 11 and the location of the terminal 101 is estimated only when the segment is changed based on the road segment (A->B->C->D->E) information, that is, in case of the aforementioned third method, though the moving object 10 does not deviates from the range of the threshold value, the difference in distance between the current location and the estimated location of the moving object 10 is smaller than the predetermined threshold value, the current location of the moving object 10 has to be reported to the server whenever the segment is changed.

However, according to the method of the present invention, the report event occurs only when the difference in distance between the current location at a predetermined time and the estimated location at the predetermined time is greater than the threshold value (threshold distance) regardless of the road configuration. Accordingly, when the difference in distance is not greater than the threshold value, the location tracking platform 11 estimates the location of the moving object 10 in real time without additional location reports, in interaction with the estimated location determining unit 1012. Therefore, the present invention has the great advantage to reduce the communication load, specifically when the number of the segments constituting the road is large.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims.

The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A system for reducing a communication load of a platform for tracking a moving object, the system comprising:
   an arrival time prediction unit receiving a current location and an arrival location of the moving object from the moving object, calculating estimated necessary time for the moving object to reach the arrival location, and transmitting the estimated necessary time to the moving object;
   a terminal which is located in the moving object, receiving the estimated necessary time and determining an estimated location; and
   a communication path on-off controlling unit inactivating a communication path for reporting the current location and the arrival location from the moving object when the terminal receives the estimated necessary time, and activating the communication path when the estimated necessary time has to be newly calculated again.

2. The system of claim 1, further comprising:
a path generation requesting unit receiving the current location and the arrival location and making a request message for generating a path between the current location and the arrival location;
a path extracting unit receiving the request message and extracting all the possible paths between the current location and the arrival location; and
a moving object location estimating unit estimating the estimated location of the moving object in interaction with the terminal,
wherein the estimated necessary time calculating unit calculates the estimated necessary time based on the extracted paths and the estimated location.

3. The system of claim 2, wherein the terminal comprises:
a current location detecting unit detecting the current location of the moving object in real time;
an estimated location determining unit determining the estimated location of the moving object in real time when the moving object is located at the current location on the basis of the detected current location, the extracted paths and the estimated necessary time; and
a distance difference measuring unit measuring a difference in distance between the current location and the estimated location in real time and determining in real time whether the difference in distance is greater than a predetermined threshold value.

4. The system of claim 3, wherein the communication path on-off controlling unit activates the communication path, only when the moving object reports the current location and the arrival location to the platform arbitrarily or the difference in distance between the current location and the estimated location is greater than the threshold value.

5. The system of claim 4, wherein, when the difference in distance is greater than the threshold value, the distance difference measuring unit reports the current location to the platform, and the platform extracts new paths between the current location and the arrival location, calculates a new estimated necessary time, and transmits the new estimated necessary time to the terminal.

6. A method of reducing a communication load of a platform for tracking a moving object, the method comprising:
(a) receiving a current location and an arrival location of the moving object, calculating an estimated necessary time for the moving object to reach the arrival location, and transmitting the estimated necessary time to the moving object;
(b) transmitting the estimated necessary time to a terminal of the moving object and allowing the terminal, which is located in the moving object, to determine an estimated location of the moving object; and
(c) inactivating a communication path through which the moving object reports the current location and the arrival location to the platform when the terminal receives the estimated necessary time.

7. The method of claim 6, further comprising:
(d) activating the communication path when the estimated necessary time has to be newly calculated again.

8. The method of claim 7, further comprising:
(e) allowing the terminal to detect the current location of the moving object in real time;
(f) determining the estimated location of the moving object at the time corresponding to the detected current location on the basis of the detected current location, the extracted paths, and the estimated necessary time;
(g) measuring a difference in distance between the current location and the estimated location in real time and determining whether the difference in distance is greater than a predetermined threshold value in real time;
(h) reporting the current location to the platform when the difference in distance is greater than the threshold value; and
(i) allowing the platform to extract new paths to the arrival location based on the reported current location, to calculate a new estimated necessary time, and to transmit the new estimated necessary time to the terminal.

9. The method system of claim 8, wherein the communication path is activated only when the moving object reports the current location and the arrival location to the platform arbitrarily or when the difference in distance between the current location and the estimated location is greater than the threshold value.

* * * * *